United States Patent
Choulette et al.

(10) Patent No.: US 6,857,077 B1
(45) Date of Patent: Feb. 15, 2005

(54) MANAGEMENT OF DATA IN A RECEIVER/DECODER

(75) Inventors: Denis Choulette, Lille (FR); Hongtao Liao, Montigny-Btx (FR)

(73) Assignee: Thomson Licensing S. A., Boulogne-Billancourt (FR)

( * ) Notice: Subject to any disclaimer, the term of this patent is extended or adjusted under 35 U.S.C. 154(b) by 0 days.

(21) Appl. No.: 09/786,151

(22) PCT Filed: Sep. 16, 1999

(86) PCT No.: PCT/IB99/01584

§ 371 (c)(1), (2), (4) Date: Feb. 27, 2001

(87) PCT Pub. No.: WO00/16554

PCT Pub. Date: Mar. 23, 2000

(30) Foreign Application Priority Data

Sep. 16, 1998 (EP) .......................... 98402290

(51) Int. Cl.⁷ .............................. G06F 12/14
(52) U.S. Cl. ................ 713/200; 713/201; 713/202; 709/215; 709/226; 709/217; 725/93
(58) Field of Search ................ 713/200, 201, 713/202; 709/215, 226, 217; 725/93

(56) References Cited

U.S. PATENT DOCUMENTS

| | | | | |
|---|---|---|---|---|
| 5,485,196 A | * | 1/1996 | Nathan et al. | 725/93 |
| 5,659,777 A | * | 8/1997 | Iwasaki et al. | 709/226 |
| 5,867,656 A | * | 2/1999 | Iwasaki et al. | 709/215 |
| 5,926,624 A | * | 7/1999 | Katz et al. | 709/217 |
| 6,308,273 B1 | * | 10/2001 | Goertzel et al. | 713/201 |

FOREIGN PATENT DOCUMENTS

| | | |
|---|---|---|
| DE | 195 11 298 A1 | 10/1996 |
| EP | 0 809 401 A1 | 11/1997 |
| EP | 0 820 193 A2 | 1/1998 |

OTHER PUBLICATIONS

Helen Custer, Inside Windows NT, Microsoft Press, A Divsion of Microsoft Corporation, 1993.*

* cited by examiner

Primary Examiner—Ly V. Hua
(74) Attorney, Agent, or Firm—Osha & May L.L.P.

(57) ABSTRACT

In order to restrict data access in a receiver/decoder, a plurality of sets of access rights are assigned to the data, each set of access rights being assigned to at least one party. The data, the sets of access rights and an identifier for each party are stored in a memory of the receiver/decoder. The identifier of a party requesting access to the data is compared with the or each identifier stored in the memory, and the party provided with the set of access rights assigned thereto in the memory of the receiver/decoder.

12 Claims, 9 Drawing Sheets

○ DIRECTORY BLOCK D OR HEADER BLOCK
□ DATA BLOCK F

58

|  | STATE OF BLOCK IN FIRST PAGE | STATE OF BLOCK IN SECOND PAGE |
|---|---|---|
|  | VALID | FREE |
| STEP 100 | VALID | CREATE |
| STEP 102 | VALID | WRITE |
| STEP 104 | VALID | NEW |
| STEP 106 | INVALID | NEW |
| STEP 108 | INVALID | VALID |

MANAGEMENT OF DATA IN A RECEIVER/DECODER

The present invention relates to the management of data. In particular, the invention relates to the following aspects of managing data, for example, in a receiver/decoder:

recording the arborescence of data stored as files and directories in a memory;

transferring blocks of data between pages of memory to enable fresh data to be stored in the memory; and restricting data access in a receiver/decoder.

The term "receiver/decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser, a video recorder, or a television.

In a broadcast digital television system, received signals are passed to a receiver/decoder and thence to a television set. As used herein, the term "digital television system" includes for example any satellite, terrestrial, cable and other system. The receiver/decoder may decode a compressed MPEG-type signal into a television signal for the television set. It may be controlled by a remote controller handset, through an interface in the receiver/decoder. The receiver/decoder is used to process the incoming bit stream, and may include a variety of application modules which cause the receiver/decoder to perform a variety of control and other functions.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

Such a receiver/decoder as described above may have a variety of devices coupled to it, such as a card reader for the user to pass an authorization card through to confirm which services the user is authorized to use, a hand-held television receiver control wand, a television display unit, and a second card reader for use with bank cards to allow the user to perform home banking functions. It may also have a variety of ports coupled to it, for example, a modem for access to the Internet and for conducting home banking transactions.

With reference to FIG. 1, the receiver/decoder includes a central processor 50 and associated memory volumes 54, 56 and 58. The memory volumes may be coupled directly to the central processor 50, or, as shown in FIG. 1, may be coupled to the central processor over a bus 52.

A variety of types of memory volumes are available. One major distinction between different kinds of memory volume is between volatile and non-volatile memory. Volatile memory retains its contents only while power is supplied to the memory, losing its contents as soon as its power supply is disconnected, while non-volatile memory retains its contents indefinitely even if its power supply is disconnected. The other major distinction is between writable memory and read-only memory.

Volatile memory is generally known as RAM, while there are various kinds of non-volatile memory. RAM is normally writable, while read-only memory is known as ROM. This latter distinction is not necessarily hard-and-fast. Any memory must of course be writable in some sense at least once, but some kinds of ROM-like memory can have their contents changed, albeit with some difficulty. Thus there are memory types such as EEPROM (electrically erasable programmable read-only memory); and Flash memory.

The different kinds of memory have different characteristics (for example, different read times and different costs), so it is often desirable to use a combination of several different kinds in a single receiver/decoder, as illustrated in FIG. 1.

FIG. 2 illustrates the organisation of data in a memory volume. The data is arranged in an arborescent arrangement of directories D and files F. As discussed in more detail below, each directory containing a list of addresses or pointers to addresses for all of the files and/or directories associated with that directory for tracing the arborescence of the contents of the data.

The arborescence of the data organisation can be thought of in terms of the various generations of a genealogical family tree, being made up of "sons" and "fathers". Each "father", that is, each directory, contains an address for each of its "sons", that is, the files and/or directories which are associated with that directory.

For example, with reference to FIG. 2, directory D6 contains an address for its son, file F6. Directory D5 contains addresses for its sons, directory D5 and file F5. Directory D2 contains addresses for each of its sons, D3, D4 and D7.

The arborescent arrangement of directories and files is constantly being reorganised by the central processor 50, for example, if a file is moved between directories and its address changed. When a file, such as file F5, is moved from directory D5 to directory D6 so that the arborescence of the data changes, then the directory from which the file was previously directly descended, that is, D5, and the directory from which the file is now directly descended, that is, D6 must be modified for correct location of the file.

Thus, changing the arborescence of the data when the file is moved is a two-step process. FIG. 3(*a*) illustrates a first process for changing the arborescence of the data in a memory volume. In step 1, an address for file F5 is written in directory D6, and in step 2 the address for file F5 is deleted from directory D5. FIG. 3(*b*) illustrates a second process for changing the arborescence of the data in a memory volume. In step 1, the address for file F5 is deleted from directory F5, and in step 2 the address for file F5 is written in directory D6.

In both of these processes, if the operating system were to crash between steps 1 and 2, then the arborescence of the data is no longer accurately recorded. In the first process, the arborescence would be as shown in FIG. 3(*a*)(ii), with addresses for file F5 being stored in both directories D5 and D6. In other words, file F5 has two fathers. In the second process, the arborescence would be as shown in FIG. 3(*b*)(ii), with neither directory D5 nor directory D6 storing an address for file F5. In other words, file F5 is an "orphan".

The present invention seeks in one aspect to provide an improved system for tracing the arborescence of data in a memory volume which can reduce the time required to update the arborescence when a file moves and which can provide increased reliability.

In a first aspect, the present invention provides a method of recording the arborescence of data stored as files and directories in a memory, said method comprising the step of storing in association with each file and directory an identifier of the directory, if any, immediately preceding that file or directory in the arborescence of the data.

This can provide for faster recording of the arborescence of the data, as each file or directory contains an identifier of the immediately preceding directory, and not identifiers of the directories and files which immediately follow the directory in the arborescence, as is conventional. Thus, the number of directories or files which must be modified when the arborescence of the data changes can be significantly less than in the conventional system; it is only necessary to change the identifier of the "father" stored in a "son", a one-step process, when the address location of the son is changed. This is particularly useful in memory volumes where writing data is particularly time-consuming, such as Flash memory.

As the modification of the arborescence when a file or directory is moved is a one-step process, the problems associated with two-step processes, as identified above, can be avoided.

The identifier preferably comprises a unique code assigned to the directory. Thus, the arborescence can be quickly changed by reading the code assigned to the new "father" when a file or directory is moved, and storing this code in the file or directory.

The identifier may be stored in a header of the file or directory. This provides for a convenient location of the file or directory in the arborescence of the data.

At least part of the data may be stored in a Flash memory volume. Thus, the data may be "spread" across two or more memory volumes, for example, across a Flash memory volume and a ROM memory volume. The data may also be stored in the aforementioned manner exclusively in a Flash memory volume. If at least part of the data is stored in a Flash memory volume, a virtual arborescence of that part of the data is preferably recorded in a RAM memory volume, and a header of a file is preferably stored in a dedicated block of Flash memory. The memory volumes may be provided in a receiver/decoder.

Preferably, the stored identifier is changed when a file or directory is moved to immediately precede another directory. This provides for quick modification of the arborescence of the data when a file is moved.

In a related aspect, the present invention provides apparatus for recording the arborescence of data stored as files and directories, said apparatus comprising means for storing in association with each file and directory an identifier of the directory, if any, immediately preceding that file or directory in the arborescence of the data. The storage means may be embodied by a central processor. The storage means may be adapted to store the identifier in a header of the file or directory.

The apparatus may be provided in combination with a Flash memory volume and a RAM memory volume. If so, the apparatus may further comprise means for recording in the RAM memory volume the arborescence of data stored in the Flash memory volume. The recording means may be conveniently provided by the central processor.

The apparatus may further comprise means for changing the stored identifier when a file or directory is moved to immediately precede another directory. The changing means may also be conveniently provided by the central processor.

This aspect of the invention also provides a receiver/decoder comprising apparatus as aforementioned.

Flash memory is generally ROM-like, in that it is non-volatile. It is also intended to be used in a generally ROM-like manner, being read from but not written to. However, Flash memory can be written to, but only with some difficulty. Specifically, Flash memory is normally divided into pages, typically each of many kilobytes in length. Changing one or more bits in a page of Flash memory from 0 to 1 can only be performed by erasing the page. In more detail, to re-use a block of Flash memory, an entire page has to be erased so that new data can be written in that block.

The information in Flash memory is organized into blocks of substantial size. A block may comprise data, for example, tables of permanent or semi-permanent information, or a program or sub-routine. The block sizes will normally be chosen to be less than the page size (if a block is larger than a page, it will usually be feasible to split it into sub-blocks which are less than the page size).

Typically, when Flash memory is updated it is desirable to retain some of the information already in it. This therefore requires the page being updated to be read into RAM to form an image of the page; this image in RAM can then be updated by inserting whatever new information is to be entered into the page. At the same time, any information in the page which is no longer required can be deleted. The updated image can then be written back into Flash memory.

To enable the blocks of Flash memory to be searched for using some kind of name or descriptor, some sort of block locating or addressing data structure must be maintained. To enable the blocks to be searched, it is known to maintain a separate block locating data structure for each page of the Flash memory. A block locating data structure is held at least partially in an external memory outside the Flash memory itself, such as in an EEPROM memory.

It has been realized pursuant to the present invention that with this block locating data structure updating of the Flash memory is required for every change in its contents. To write a fresh block requires Flash memory updating; deletion of a block similarly requires updating. Although it is not necessary to physically delete the block, the block locating data structure has to be updated to indicate that the block is no longer valid.

Such a system for updating Flash memory has a number of drawbacks. First, an entire page of the Flash memory must be copied into RAM memory to enable fresh data to be stored in the Flash memory. Therefore, it is necessary to have a buffer in the RAM memory which is the same size as a page of Flash memory. Secondly, it is essential to have an EEPROM memory volume for storing the block locating data structure for identifying the location and status of blocks stored in the Flash memory.

The present invention seeks, in a second aspect, to provide an improved system for updating the contents of a Flash memory volume which does not require the use of ROM or RAM memory to effect updating.

In a second aspect, the present invention provides a method of transferring blocks of data between pages of memory to enable fresh data to be stored in said memory, said memory comprising a plurality of pages, one page of said memory being designated as a source page comprising at least one valid block containing valid data and at least one invalid block containing invalid data, and at least one of the pages of memory being designated as a transfer page, the method comprising the step of:

copying the or each valid block from the source page into said transfer page, at least one such block having a position in said transfer page different from its position in the source page; and erasing the source page.

By altering the position of at least one valid block, the valid blocks may be arranged together, for example, at one end, such as the start, of the transfer page. This can enable sufficient room for storing the fresh data to be left at the other end of the transfer page.

Preferably, the or each valid block is copied into the transfer page in such a manner as to create the largest unfragmented memory area in the transfer page for receiving the fresh data.

Thus, this aspect of the present invention also provides a method of storing data in memory, said memory comprising a plurality of pages, one page of said memory comprising a source page comprising at least one valid block containing valid data and at least one invalid block containing invalid data, and at least one of the pages of memory being designated as a transfer page initially comprising only free blocks, the method comprising the steps of:

copying the or each valid block from the source page into said transfer page, at least one such block having a position in said transfer page different from its position in the source page;

erasing the source page; and storing the data in said transfer page.

Preferably, the erased source page is redesignated as a new transfer page. This can enable the aforementioned methods to be repeated when further data is to be stored in the memory. This redesignation is preferably conducted immediately after the source page has been erased.

In one preferred embodiment, a page is designated as the source page in dependence on the cumulative size of the invalid blocks of the page. For example, the designated source page may be a page having at least one invalid block having a cumulative size equal to or greater than the size of the fresh data. This can ensure that there will be sufficient room for storing the data in the transfer page once the copying of the valid blocks to the transfer page has been completed.

The blocks may have a variable size. This provides a number of advantages over the use of blocks of fixed size. Fixed blocks typically have a size of 5 kbytes. If data having a size of 3 kbytes is to be stored in a fixed block, 2 kbytes of memory would be effectively wasted. By using a block of variable size, the size of the block is determined solely by the size of the data stored therein, thus increasing the effective data storage capacity of the memory. By allowing valid variable size blocks to be movable, when a page is updated the blocks can be rearranged on the transfer page so that the spare capacity of the page is provided in a single unused area of the page.

Preferably, the memory comprises a memory in which data is not freely writable, such as a Flash memory volume.

A valid block may be changed to an invalid block by changing the value of a one-bit flag stored in the block, preferably in the header of the block. By changing the value of the bit from 1 to 0, that is, deleting the bit, the change of status of the block stored in Flash memory may be performed without re-writing the entire page.

The memory may comprise a memory volume of a receiver/decoder, in which the data may be downloaded from a bitstream, preferably in the form of MPEG tables.

This aspect of the present invention also provides apparatus for transferring blocks of data between pages of memory to enable fresh data to be stored in said memory, said memory comprising a plurality of pages, one page of said memory being designated as a source page comprising at least one valid block containing valid data and at least one invalid block containing invalid data, and at least one of the pages of memory being designated as a transfer page, said apparatus comprising:

means, such as a central processor, for copying the or each valid block from the source page into said transfer page, at least one such block having a position in said transfer page different from its position in the source page; and means, such as the central processor, for erasing the source page.

Access to data stored in the memory of the receiver/decoder may be required by a number of parties. One such party is the author of the data, who may require access to the data to correct an error in the data or to replace the data with an upgraded version. Another such party is the provider of an interactive application which uses the data. Whilst wanting such a provider to have access to the data so as to be able to read the data, thereby enabling the interactive application to use the data, the author of the data may want to prohibit the provider from over-writing the data with its own data. The provider may also want to prohibit any access to the data by, for example, the manufacturer or the owner of the receiver/decoder, thereby maintaining the confidentiality of the data to these parties.

The present invention seeks in a third aspect to provide a technique for restricting data access in a receiver/decoder.

In a third aspect, the present invention provides a method of restricting data access in a receiver/decoder having a memory, the method comprising the steps of:

assigning a plurality of sets of access rights to the data, each set of access rights being assigned to at least one party;

storing the data, the sets of access rights and an identifier for each party in a memory of the receiver/decoder;

comparing the identifier of a party requesting access to the data with the or each identifier stored in the memory; and providing the party with the set of access rights assigned thereto in the memory of the receiver/decoder.

Thus, by assigning a plurality of access rights to different parties prior to storing the data in the memory of the receiver/decoder, secure segregation of data in the receiver/decoder can be afforded.

Preferably, the sets of access rights are stored in a header for the data. This can provide for convenient location of the access rights for the data. One or more identifiers for the parties may also be stored in the header for the data.

The data may be downloaded from a bitstream transmitted by a transmitting system, the sets of access rights and identifiers for the parties being stored within the data at the transmitting system. Thus, this aspect of the present invention extends to a method of restricting access to data broadcast in a digital broadcast system, said method comprising the steps, at a transmitting system, of:

assigning a plurality of sets of access rights to the data, each set of access rights being assigned to at least one party;

storing the sets of access rights and identifiers for the parties within the data; and transmitting the data;

and, at a receiver/decoder having a memory, the steps of:

downloading and storing the transmitted data in the memory of the receiver/decoder;

comparing the identifier of a party requesting access to the data with the identifiers stored in the memory; and providing the party with the set of access rights assigned thereto in the memory of the receiver/decoder.

The data may be transmitted in any suitable form, such as in a digital datastream.

A further set of access rights may be assigned to at least one party whose identifier is not stored in the memory of the receiver/decoder, such a party requesting access to the data being provided with the further set of access rights. Thus, an unknown or unfavoured party may be prohibited from accessing the data by the selection of a suitable set of access rights.

A particular set of access rights may be assigned to one party only. Preferably, this party is the author of the data. Thus, the author of the data may be assigned a separate set of access rights, which can enable full access to the data by the author.

A particular set of access rights may be assigned to a group of parties, identifiers for each of the members of the group being stored in the memory of the receiver/decoder. Thus, by providing a set of access rights to a group of parties, the number of sets of access rights which need be assigned can be reduced.

Preferably a set of access rights is used to determine whether a party is prohibited from reading the data. A set of access rights may also be used to determine whether a party is prohibited from overwriting the data.

The data may be stored in a Flash memory volume of the receiver/decoder.

This aspect of the present invention also extends to apparatus for restricting access to data stored in a memory of a receiver/decoder, a plurality of sets of access rights being assigned to the data, each set of access rights being assigned to at least one party, an identifier for each party being stored in the receiver/decoder, the apparatus comprising:

means, such as a central processor, for comparing the identifier of a party requesting access to the data with the identifiers stored in the memory; and means for providing the party with the set of access rights assigned thereto in the memory of the receiver/decoder. The central processor may also provide the party with its assigned set of access rights.

This aspect of the invention also provides a receiver/decoder comprising a memory for storing data, a plurality of sets of access rights assigned to the data and an identifier for each party, and apparatus for restricting access to the data as aforementioned.

The receiver/decoder may further comprise a security module for storing the identifiers for the parties.

The receiver/decoder may further comprise a receiver for receiving a bitstream including said data, said sets of access rights and said identifiers, and means, such as a demultiplexer and descrambler, for downloading said data, said sets of access rights and said identifiers into said memory. The receiver/decoder is preferably arranged to download MPEG tables.

This aspect of the present invention also provides a transmission system comprising:

means for assigning a plurality of sets of access rights to the data, each set of access rights being assigned to at least one party;

means for storing the access rights and identifiers for the parties within the data; and means, such as a transmitter, for transmitting a bitstream including said data. The assigning means and the storage means of the transmission system may be provided by a processing unit of the transmitting system.

The assigning means may be adapted to assign a further set of access rights to parties whose identifiers are not stored in the memory of the receiver/decoder. The assigning means may also be adapted to assign a set of access rights to a group of parties, identifiers for each of the members of the group being stored in said data.

This aspect of the present invention also provides a combination of a receiver/decoder as aforementioned and a transmission system as aforementioned.

Various functions of the receiver/decoder may be implemented in hardware, for example in a dedicated integrated circuit; this may provide enhanced speed of operation. Preferably, however, at least some of the functions are implemented in software, preferably implemented by processing means which runs the applications; this can allow greater flexibility, require less components, and allow the receiver/decoder to be updated more readily.

Any of the above features may be combined together in any appropriate combination. Apparatus features may be applied to method aspects and vice versa.

Preferred features of the present invention will now be described, by way of example, with reference to the drawings, in which.

Figure 4:
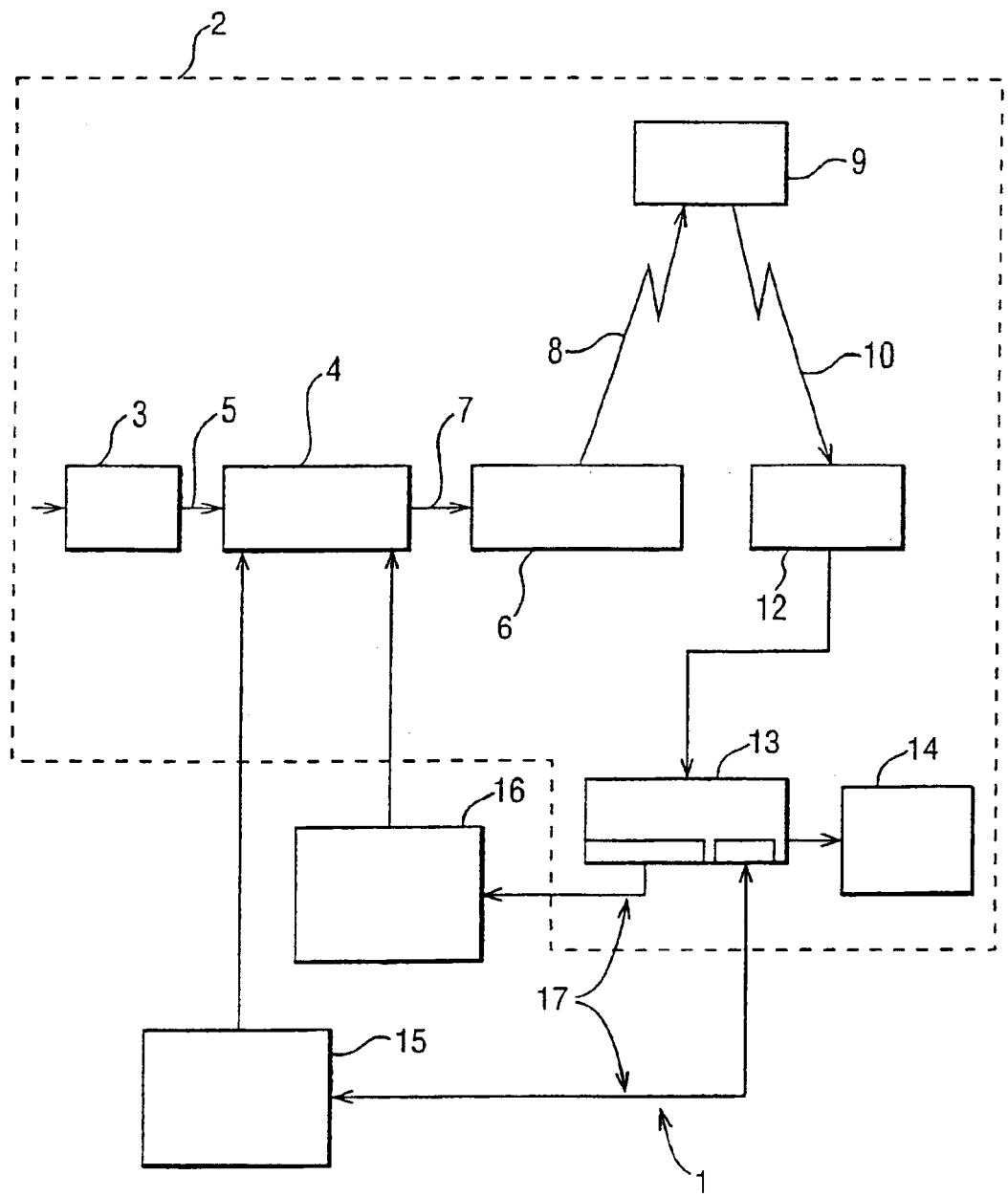
FIG. 4 is a schematic diagram of a digital television system.

An overview of a digital television system 1 is shown in FIG. 4. The system includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14.

Other transport channels for transmission of the data are of course possible, such as terrestrial broadcast, cable transmission, combined satellite/cable links, telephone networks etc.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 13 having access to an equivalent to the exploitation key stored on a smart card inserted in the decoder to decrypt the encrypted control word and thereafter descramble the transmitted data. A paid-up subscriber will receive, for example, in a broadcast monthly ECM (Entitlement Control Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the decoder, enables the end user to interact with various applications via a modem back channel 17. The modem back channel may also be used for communications used in the conditional access system 15. An interactive system may be used, for example, to enable the viewer to communicate immediately with the transmission centre to demand authorisation to watch a particular event, download an application etc.

Figure 5:
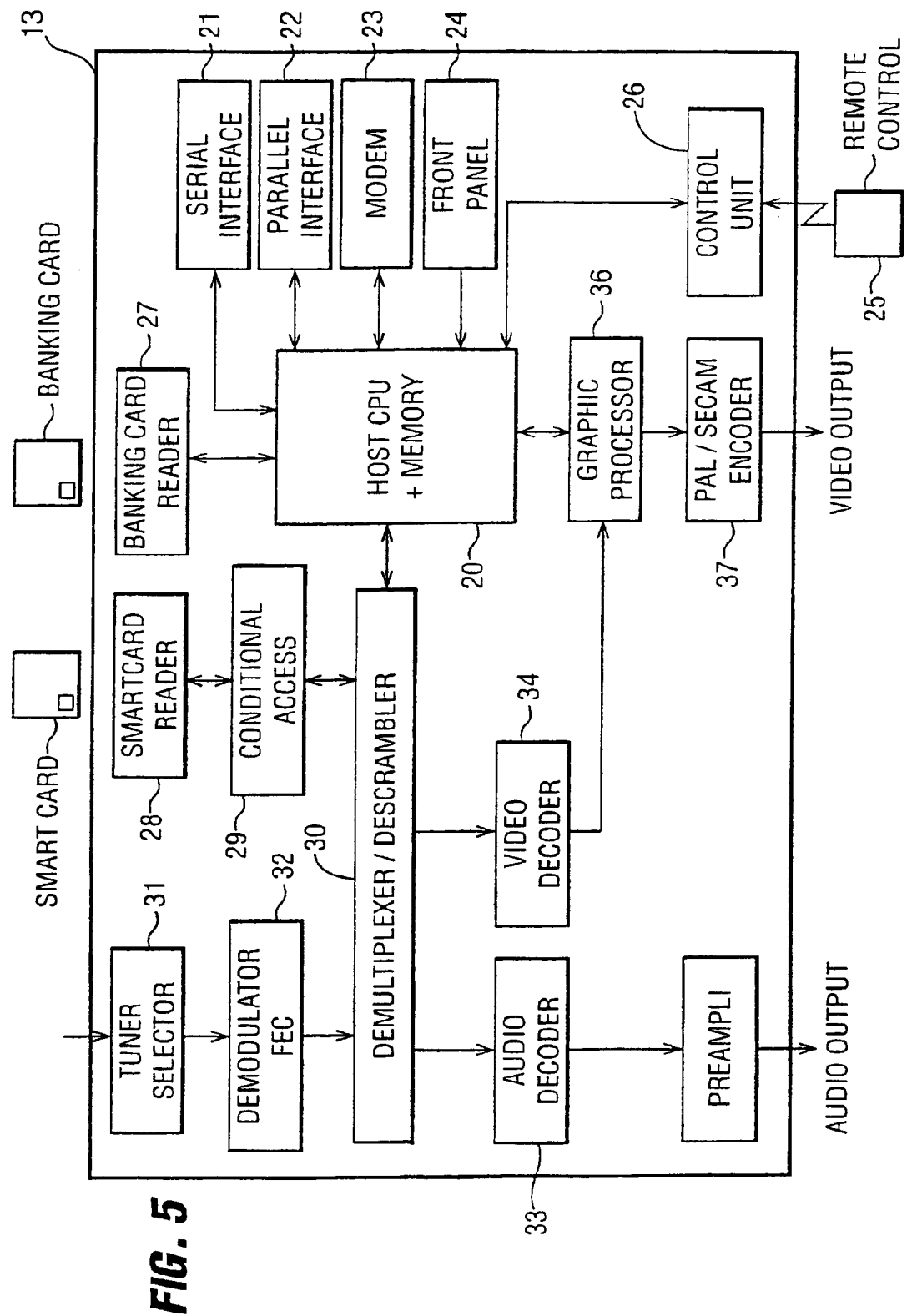
FIG. 5 is a schematic diagram of the structure of a receiver/decoder of the system of FIG. 4.

Referring to FIG. 5, the elements of the receiver/decoder 13 or set-top box will now be described. The elements shown in this figure will be described in terms of functional blocks.

The decoder 13 comprises a central processor 20 including associated memory elements and adapted to receive input data from a serial interface 21, a parallel interface 22, a modem 23 (connected to the modem back channel 17 of FIG. 4), and switch contacts 24 on the front panel of the decoder.

The decoder is additionally adapted to receive inputs from an infra-red remote control 25 via a control unit 26 and also possesses two smartcard readers 27, 28 adapted to read bank or subscription smartcards 29, 30 respectively. The subscription smartcard reader 28 engages with an inserted subscription card 30 and with a conditional access unit 29 to supply the necessary control word to a demultiplexer/descrambler 30 to enable the encrypted broadcast signal to be descrambled. The decoder also includes a conventional tuner 31 and demodulator 32 to receive and demodulate the satellite transmission before being filtered and demultiplexed by the unit 30.

In the case of received audio and video signals, the MPEG packets containing these signals will be demultiplexed and filtered so as to pass real time audio and video data in the form of a packetised elementary stream (PES) of audio and visual data to dedicated audio and video processors or decoders 33, 34. The converted output from the audio processor 33 passes to a preamplifier 35 and thereafter via the audio output of the receiver/decoder. The converted output from the video processor 34 passes via a graphic processor 36 and PAL/SECAM encoder 37 to the video output of the receiver/decoder.

Processing of data within the decoder is generally handled by the central processor 20. The central processor 20 provides a platform having considerable flexibility in enabling an application to communicate with a variety of devices.

As used in this description, an application is a piece of computer code for controlling high level functions of preferably the receiver/decoder 13. For example, when the end user positions the focus of remote control 25 on a button object seen on the screen of the television set 14 and presses a validation key, the instruction sequence associated with the button is run.

An interactive application proposes menus and executes commands at the request of the end user and provides data related to the purpose of the application. Applications may be either resident applications, that is, stored in the ROM (or Flash or other non-volatile memory) of the receiver/decoder 13, or broadcast and downloaded into the RAM or Flash memory of the receiver/decoder 13.

Applications are stored in memory locations in the receiver/decoder 13 and represented as resource files. The resource files comprise graphic object description unit files, variables block unit files, instruction sequence files, application files and data files, as described in more detail in the above-mentioned patent specifications.

Figure 1:
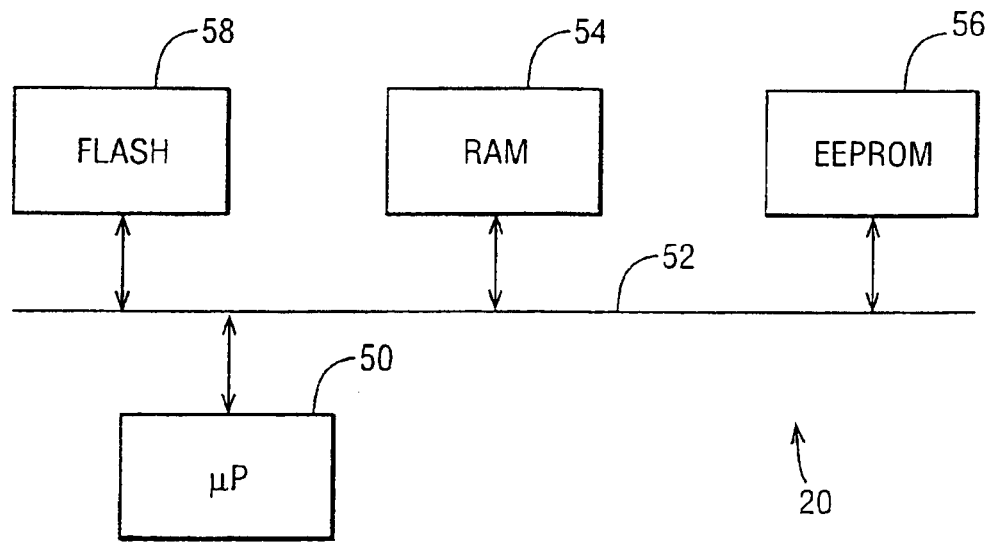
FIG. 1 is a schematic diagram of a known arrangement of memory volumes in a receiver/decoder.

With reference to FIG. 1, as conventional the receiver/decoder contains memory divided into a RAM volume 54, a Flash volume 58 and a ROM volume 56, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Figure 6:
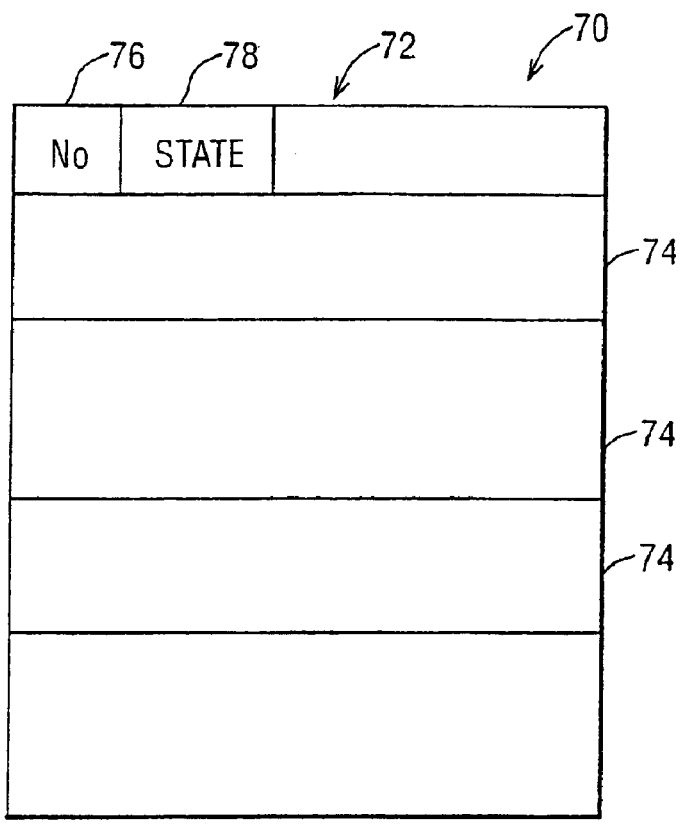
FIG. 6 illustrates the arrangement of a page of Flash memory.

The Flash memory 58 is divided into pages, typically each of many kilobytes in length. Data is stored in Flash memory in the form of blocks of data FIG. 6 illustrates the arrangement of a page of Flash memory. The page 70 comprises a header 72 of length 12 bytes, and blocks 74 of variable length. A block 74 has a size which is determined by the size of the data which is stored in the block.

The header 72 of the page 70 contains, inter alia, the number (NO 76) of the page in the Flash memory and the state (STATE 78) of the page. A page may take one of two stable states:

(i) an EMPTY state, when the page contains only empty blocks; and
(ii) a VALID state, when the page contains one or more blocks of data.

The Flash memory 58 contains at least one page having an EMPTY state.

A page may also take one of three temporary states during the copying of the contents of one page to another page (as discussed in more detail below):
(i) a WRITE state, when contents of a page are being copied to that page from another page;
(ii) a NEW state, when copying to that page has been completed; and
(iii) an INVALID state, when the copying of contents from that page to another page has been completed.

Figure 7:
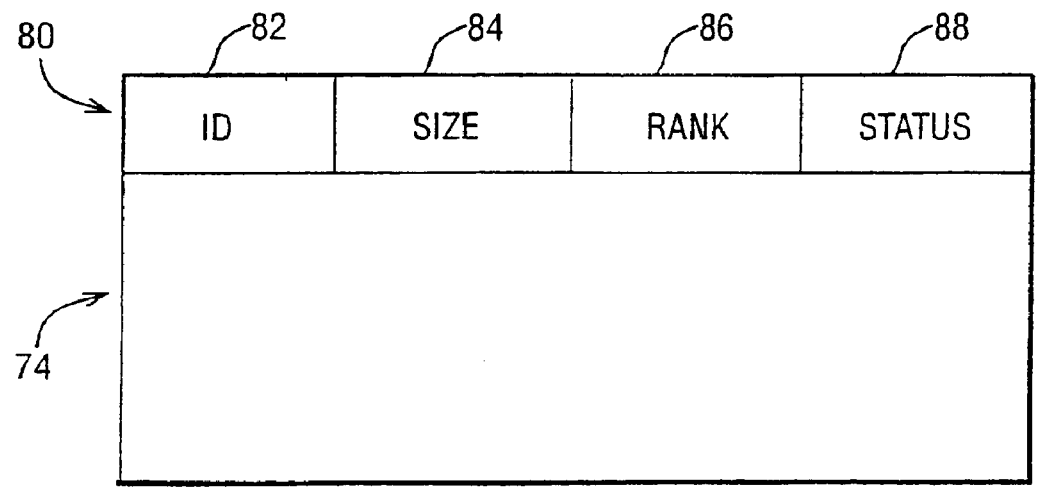
FIG. 7 illustrates a header of a block of a page of Flash memory.

With reference to FIG. 7, each block 74 includes a header 80 of length 16 bytes. The header 80 includes the following fields:
(i) an identification (ID 82) in the form of a unique number assigned to the file to which the block relates;
(ii) the size (SIZE 84) of the block;
(iii) the rank identification (RANK 86) of the block; and
(iv) the status (STATUS 88) of the block.

RANK 86 provides a unique identifier of the block when a file is split into a plurality of blocks, each of these blocks being given a respective rank identification. The RANK 86 also serves to specify the position of the block within the file.

The block having a RANK=0 comprises a header block for the file. The header block does not include any of the raw data of the file, but instead includes a number of the file attributes.

Figure 8:
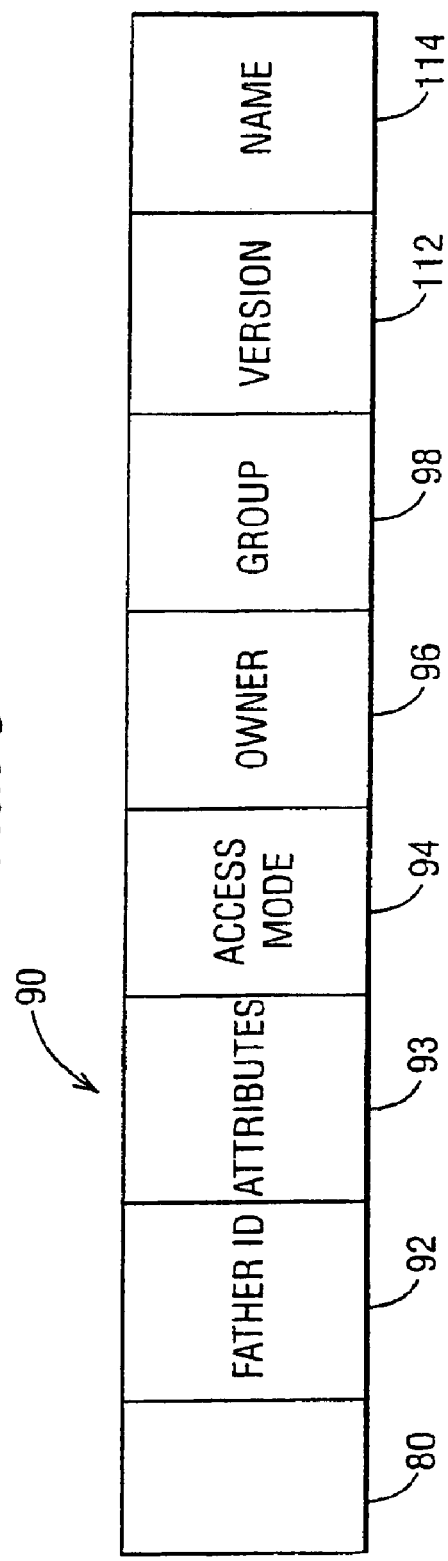
FIG. 8 illustrates the contents of a header block of a file stored in Flash memory.

FIG. 8 illustrates the contents of a header block 90 of a file. The header block 90 comprises a header 80, in which RANK 86 is set to 0. The header block 90 includes a FatherID field 92. The FatherID field 92 contains the ID 82 of the "father" of the file in the arborescent structure of directories and files stored in the Flash memory 58.

Figures 9, 11:
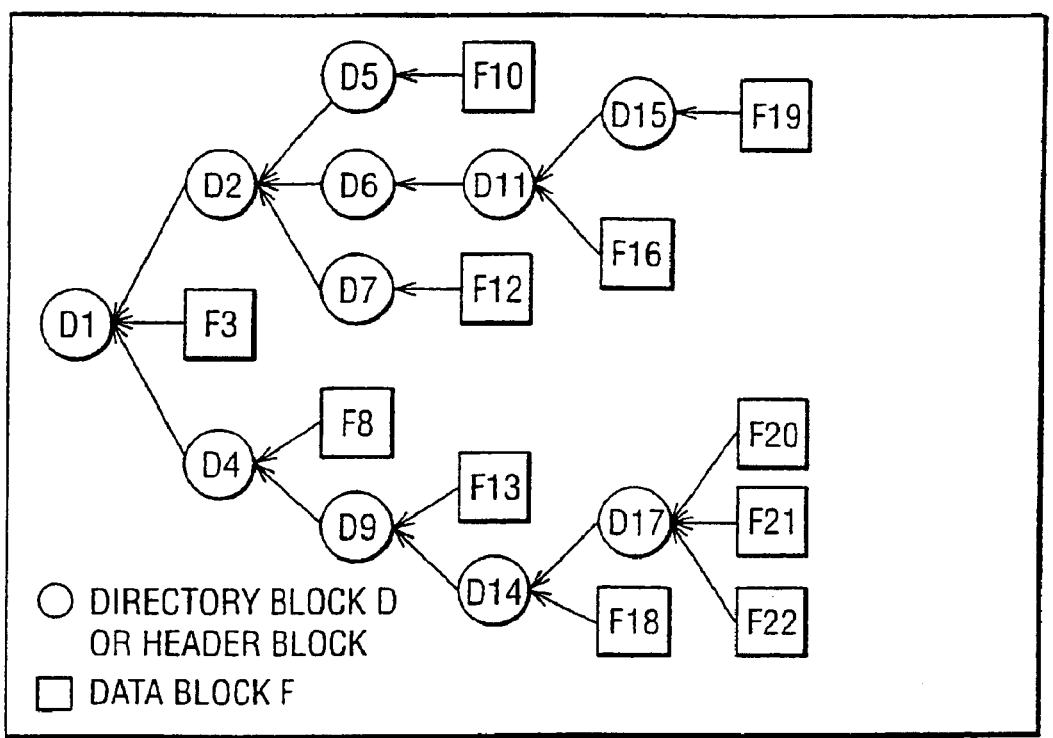
FIG. 9 illustrates the arborescence of data stored in Flash memory.
FIG. 11 is a flow diagram illustrating a method of copying a block of VALID data from one page of Flash memory to another.

FIG. 9 illustrates an example of the arborescent structure of blocks stored in the Flash memory 58. The blocks comprise directory blocks and header blocks D, and data blocks F containing the raw data of a file. A directory block is a header block, such as block D2, which is not directly associated with a file but serves to act as a locator for other directory or header blocks.

Upon boot-up of the receiver/decoder, the arborescence of the data stored in the Flash memory 58 is read and an outline of the arborescence is stored in the RAM volume 54 in the form of a chart or any other convenient form. The arborescence is determined by reading the ID 82 and RANK 86 of each data block, and the ID 82, RANK 86 and FatherID 92 of each directory block and header block. For example, header block D1 has ID=1, RANK=0 and FatherID=0 (as it has no "father"). File block F3 has ID=1 and RANK=1. Directory block D4 has ID=4, RANK=0 and FatherID=1 (as its "father" is header block D1 having an ID=1). Header block D5 has ID=5, RANK=0 and FatherID=2.

In this manner, the arborescence of the data can be quickly generated, as only up to three data fields of each block must be read to generate the arborescence.

Moreover, when a header block and associated data blocks are moved within the data arborescence, it is only necessary to write the new FatherID in the header of the header block. For example, if header block D17 and associated data blocks F20, F21 and F22 were moved so that the father of header block D17 became header block D15, it would only be necessary to amend the FatherId of header block D17 to FatherId=15. No modification of the header of previous direct ancestor of header block D17, that is, block D14, or of the header of new direct ancestor of header block D17, that is, block D15, is required.

When the arborescence of the data stored in the Flash memory changes, the chart stored in the RAM volume 54 is updated.

Figure 2:
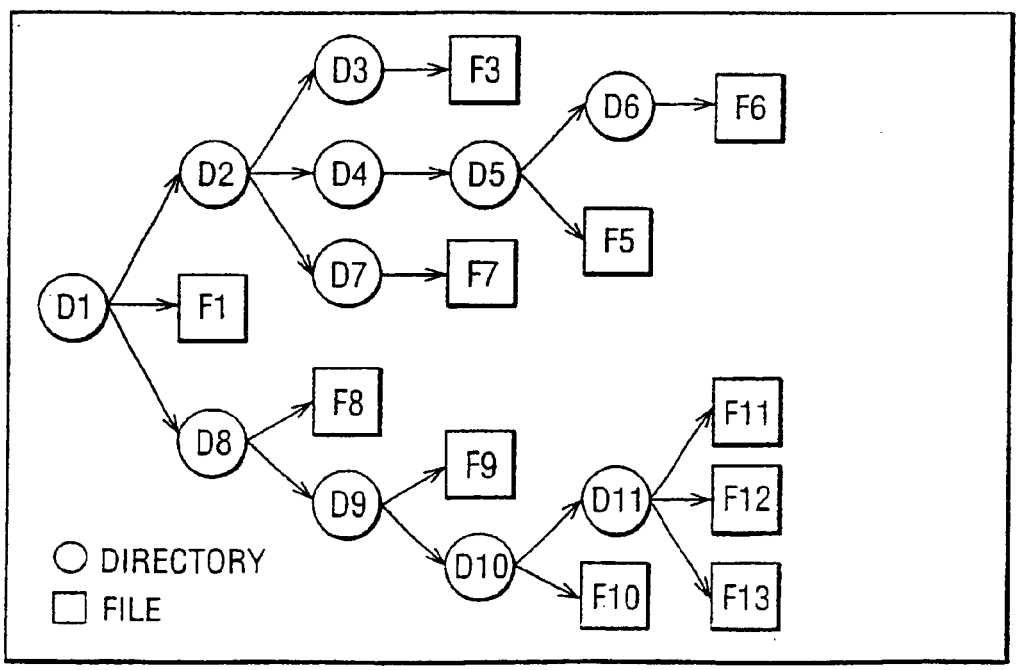
FIG. 2 illustrates a prior arborescent organisation of data in a memory volume.
Figure 3A:
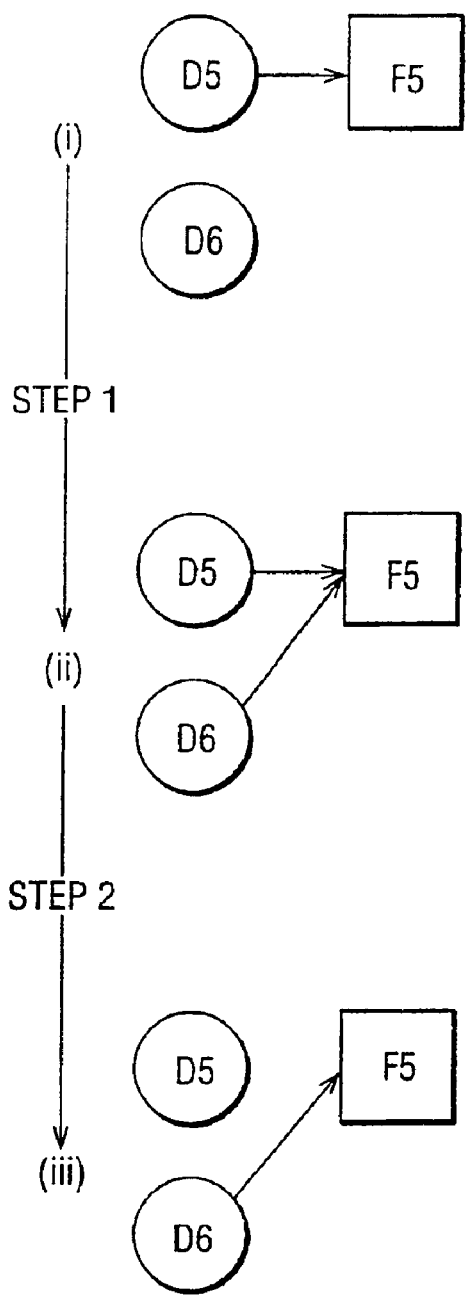
FIG. 3(a) illustrates a prior process for changing the arborescence of data in a memory volume.
Figure 3B:
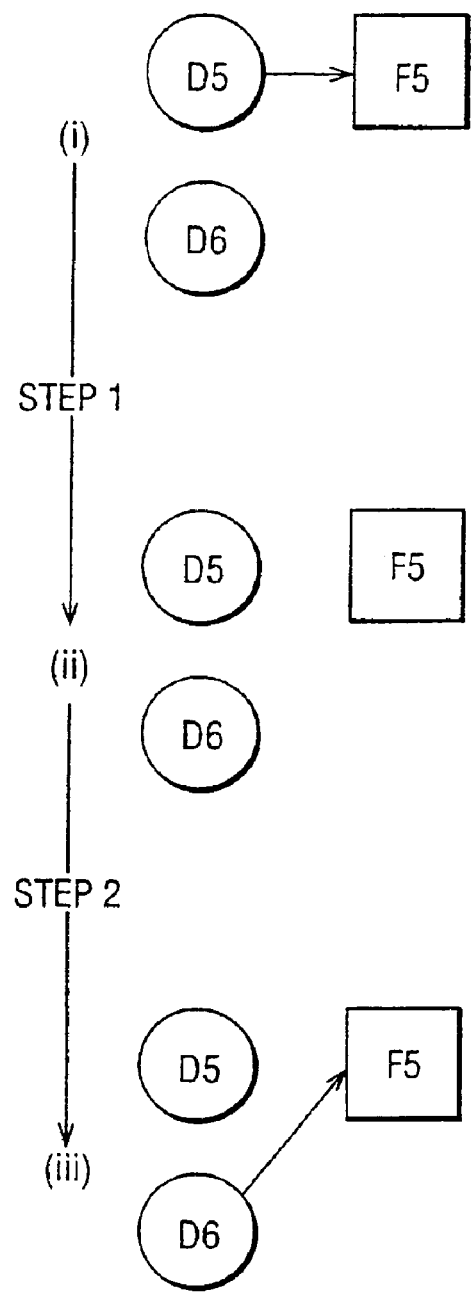
FIG. 3(b) illustrates another prior process for changing the arborescence of data in a memory volume.

As discussed earlier, data may be stored in the receiver/decoder either in a single memory volume or across a plurality of memory volumes. The above described arborescent organisation of data in Flash memory, in which header blocks relate to their father, is also applicable to data stored in ROM, RAM or any combination of ROM, RAM and Flash memory. However, the improvements provided by this new arborescent organisation of data are most notable in the data stored in Flash memory, in which the time taken to re-write data stored therein is highest. Thus, data stored in the RAM and ROM memory may alternatively be stored in the Flash memory with the prior arborescent arrangement described with reference to FIGS. 2 and 3.

Referring back to FIG. 8, header block 90 includes an Attributes field 93 which indicates whether the block is a directory block or a header block.

Header block 90 includes Access mode field 94, Owner field 96 and Group field 98. These three fields enable access to the file by various parties to be partially or fully restricted.

The Owner field 96 contains an identification ID of the author of the file. The Group field 98 contains a group identification ID for authorised users of the file. For example, if the file relates to a program for a smartcard reader, the authorised users of the file will include the providers of interactive applications which utilise the program. The identification IDs of each authorised user of the file are stored in a security module in the receiver/decoder.

The contents of the Access mode field 94 determine the extent to which access to the file is permitted by the author of the file, as specified in the Owner field 96, an authorised user of the file, as specified in the Group field 98, and others, such as the manufacturer of the receiver/decoder and a user of the receiver/decoder.

Figure 10:
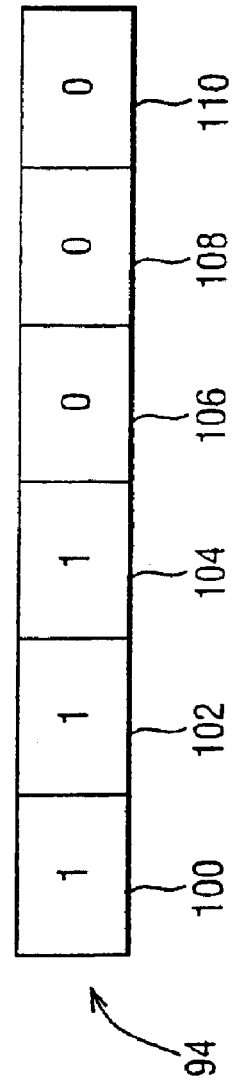
FIG. 10 illustrates the contents of the Access mode field in a header block.

FIG. 10 illustrates the Access mode field 94 in more detail. The field 94 comprises six bits, two bits 100, 102 assigned to the author, two bits 104, 106 assigned to the authorised users, and two bits 108 and 110 assigned to others. The values of bits 100, 104 and 108 determine whether reading of the file is prohibited by the author, the authorised users and other respectively, and the values of bits 102, 106 and 110 determine whether overwriting of the file is prohibited by the author, the authorised users and other respectively. In the example shown in FIG. 10, overwriting of the file by authorised users is prohibited, as is any reading or overwriting of the file by others.

The contents of the Access mode field 94, Owner field 96 and Group field 98 are set prior to the storage of the file in the receiver/decoder. If the file is to be transmitted to the receiver/decoder by the transmitter 6 of the broadcast centre, the contents of the aforementioned fields may be set in the broadcast centre prior to transmission. Alternatively, the contents of these fields may be set by the author upon writing the file.

When access to a file is required, the accessor identifies itself with its identification ID. The central processor 50 determines whether the ID of the accessor corresponds with the ID stored in the Owner field 96. If so, the accessor is identified as the author of the file who is assigned with the set of access rights contained in bits 100 and 102. In the example shown in FIG. 10, reading and overwriting of the file by the author is permitted by the central processor 50.

If the accessor is not the author of the file, the central processor 50 refers to the security module to determine whether the ID of the accessor is a member of the group of authorised users specified in the Group field 98. If so, the accessor is identified as an authorised user of the file who is assigned with the set of access rights contained in bits 104 and 106. In the example shown in FIG. 10, the authorised user is permitted only to read the file by the central processor 50.

If the accessor is not an authorised user of the file, then the accessor is identified as an "other" who is assigned with the set of access rights contained in bits 108 and 110. In the example shown in FIG. 10, any access to the file by the accessor is prohibited by the central processor.

The values of the bits 100 to 110 can only be changed by overwriting of the file. In the example shown in FIG. 10, only the author of the file is permitted to overwrite the file. Thus, the provision of the Access mode field 94, the Owner field 96 and the Group field 98 in the header block 90 of the file provides for a simple but yet effective security system for the file.

With reference to FIG. 8, the header block 90 also includes a Version field 112 which contains the version number of the file, and a Name field 114 which contains the name of the file in ASCII code.

Referring back to FIG. 7, the STATUS field 88 of a block of a page of the Flash memory may take one of three stable states:
(i) a FREE state, when the block is empty; and
(ii) an INVALID state, when a new version of the block has been copied to another page of the Flash memory, or when the file has been deleted; and
(iii) a VALID state, when a previous version of the block has been set to an INVALID state.

The STATUS field 88 of a block includes a one-bit flag which indicates whether the block is VALID or INVALID. If this one-bit flag has a value of 1, the block is VALID, and if the flag has a value of 0, the block is INVALID. Therefore, when the status of a block is to be changed from VALID to INVALID, this one bit is deleted. Thus, in Flash memory, this change of status of a block can be recorded without having to re-write the entire page of Flash memory.

Only usually the last block of the page is in the FREE state, and represents the amount of memory space available for storing fresh data in that page.

A block may also take one of three temporary states during the writing of the contents of the block, or the copying of the contents of the block, via RAM, to another page (as discussed in more detail below):
(i) a CREATE state, when the header of the block is being written;
(ii) a WRITE state, when the remainder of the contents of the block is being written; and
(iii) a NEW state, when the block has been completed but writing or copying of additional blocks of the file has yet to be completed.

FIG. 11 illustrates the process of copying a single VALID block of a first page to a FREE block in a second page. In step 100, the state of the FREE block in the second page is changed to CREATE whilst the header of the VALID block is being copied, via RAM, into that block. In step 102, the state of the CREATE block is changed to WRITE whilst the contents of the VALID block is being copied. In step 104, the state of the WRITE block is changed to NEW when the copying of the contents of the block has been completed. In step 106 the state of the copied VALID block of the first page is changed to INVALID. Finally, in step 108 the state of the NEW block in the second page is changed to VALID.

By assigning a NEW state, rather than a VALID state, to the WRITE block in step 104 when the copying of the contents of the block has been completed, it is ensured that no two VALID blocks have the same ID and RANK at the same time. This removes the possibility of two such VALID blocks existing if the operating system were to crash between steps 104 and 106.

If such a crash were to occur during copying of a data block from one page of Flash memory to another, on start-up the operating system checks for the presence of any NEW blocks in the Flash memory. If a NEW block is located, the operating system searches for a VALID block having the same RANK and ID. If such a VALID block is located, the status of the NEW block is changed to INVALID, if not, the status of the NEW block is changed to VALID. This ensures that no two VALID and FREE blocks having the same RANK and ID are retained in the memory without having to re-write either of the pages of Flash memory.

When a plurality of VALID blocks having the same ID are to be copied from a first page to a second page, copying of the first VALID block is suspended after step 104 has been completed. Copying of each of the subsequent VALID blocks is the performed in turn up to step 104. Then, the states of all of the copied VALID blocks of the first page are changed to INVALID, and the states of the NEW blocks in the second page changed to VALID.

If a crash were to occur during copying of the plurality of data blocks from one page of Flash memory to another, on start-up the operating system checks for the presence of any NEW blocks in the Flash memory. If a plurality of NEW blocks is located, the operating system searches for corresponding VALID and INVALID blocks having the same RANK and ID. If all of the corresponding blocks are VALID, the state of each of the NEW block is changed to INVALID. If not, that is, the state of at least one of the corresponding blocks is INVALID, the state of each of the remaining corresponding VALID blocks is changed to INVALID and then the state of each of the NEW blocks is changed to VALID.

As mentioned earlier, one of the pages of Flash memory is maintained in an EMPTY state. In time, all of the remaining pages of Flash memory will become full with VALID and INVALID blocks of data, and so it will become necessary to effectively delete one or more of the blocks of INVALID data to provide enough space for a block containing fresh data. However, party blocks of data cannot be overwritten with new data; an entire page of Flash memory must be erased to enable that page to be re-used.

In order to provide enough space for a new file to be written in Flash memory, in overview the VALID blocks only of a VALID page are copied, via RAM, to an EMPTY page, the INVALID blocks of the VALID page not being copied to the EMPTY page. The VALID blocks are copied in such a manner that at least one of the blocks has a position in the EMPTY page which is different from its position in the VALID page. For example, the VALID blocks may be copied to the top of the EMPTY page. By rearranging the VALID blocks upon copying, the largest unfragmented memory area in the EMPTY page may be created, thereby leaving enough room, for example, at the foot of the page to store the fresh data. The contents of the VALID page are erased, the EMPTY page becomes a VALID page and the previous VALID page becomes the EMPTY page.

Figure 12:
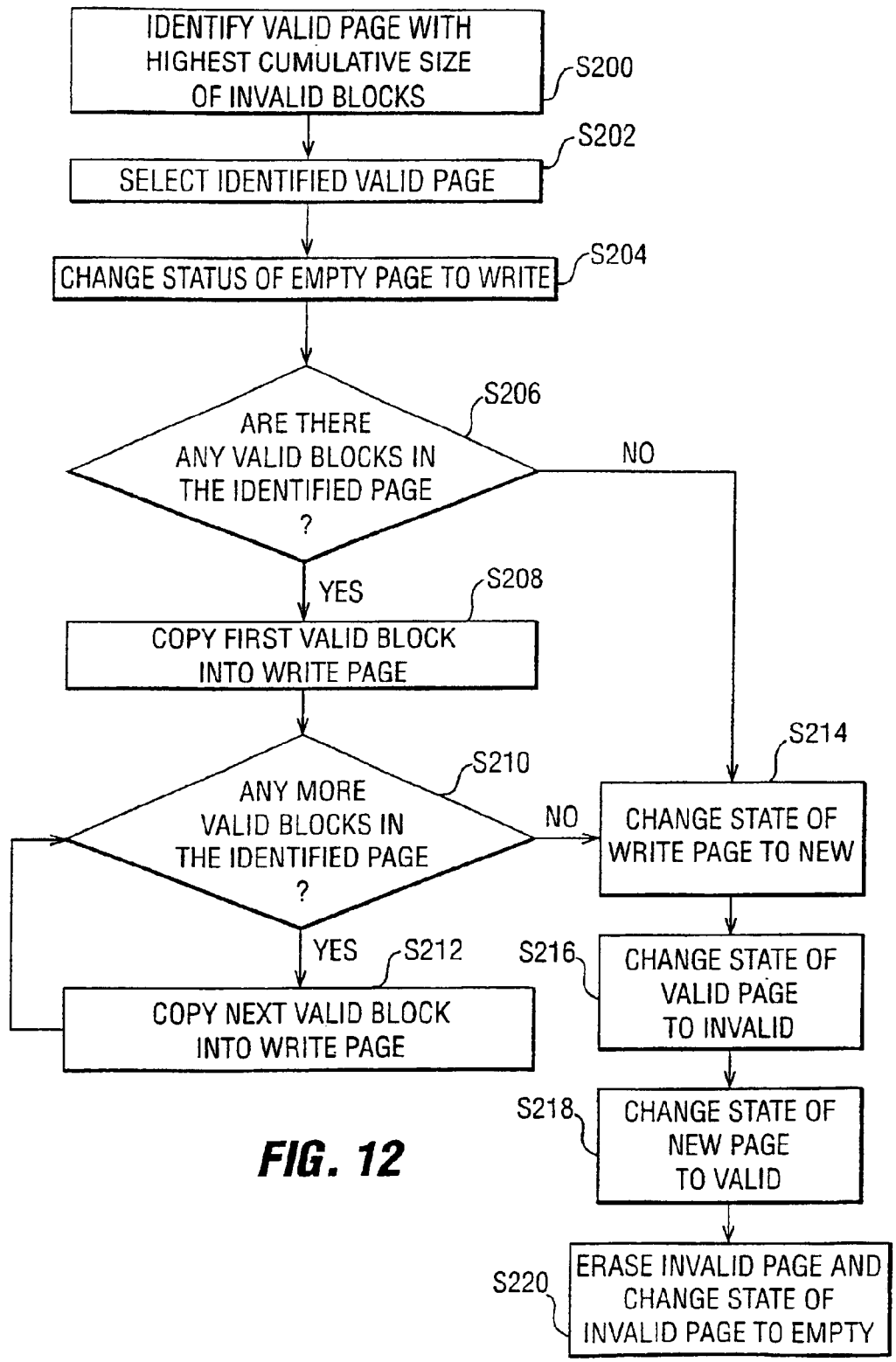
FIG. 12 is a flow diagram illustrating a method of copying blocks of data from one page of Flash memory to another.

A method of "cleaning" the contents of the Flash memory when fresh data is to be stored in the Flash memory is described in more detail below, with reference to FIGS. 12 and 13.

In step 200, the central processor 50 reviews the headers 80 of each of the blocks 74 of each of the VALID pages of the Flash memory in order to identify the VALID page in which the cumulative size of the INVALID blocks is the greatest.

In step 202, the identified VALID page is selected.

In step 204, the status of the empty page is changed from EMPTY to WRITE, and the number of the selected VALID page is stored temporarily in the header of the WRITE page.

In step 206, the central processor 50 determines whether there are any VALID blocks in the VALID page. If there are one or more VALID blocks in the VALID page, in step 208, the first VALID block is copied, via RAM, into the WRITE page.

In step 210, the central processor 50 determines whether there are any more VALID blocks in the VALID page. If there is a second VALID block, in step 212 the second VALID block is copied, via RAM, into the WRITE page directly beneath the VALID block previously copied into the WRITE page.

Steps 210 and 212 are repeated as necessary until the central processor 50 determines that there are no more VALID blocks in the VALID page. Then, in step 214, the status of the WRITE page is changed to NEW. In step 216, the status of the VALID page is changed to INVALID. In step 218, the status of the NEW page is changed to VALID, and finally in step 220, the INVALID page is erased and the status of the erased page changed to EMPTY, so that there is once again at least one EMPTY page of Flash memory.

Figure 13:
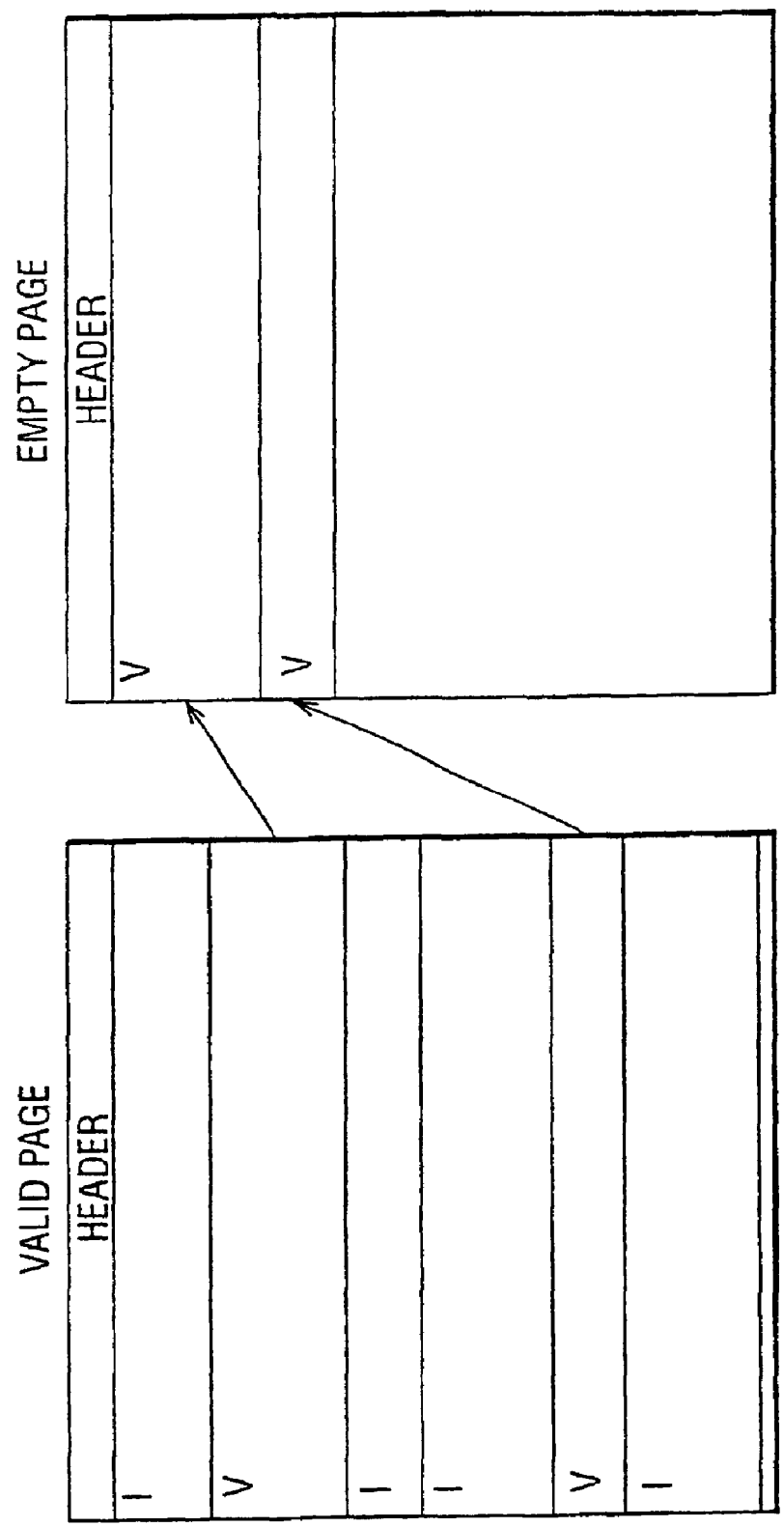
FIG. 13 illustrates the overall effect of the method illustrated in FIG. 12.

The overall effect of the above method is summarised in FIG. 13. In this preferred embodiment, the VALID blocks V of the VALID page are effectively moved to the top of the EMPTY page in order to provide storage space in the EMPTY page for fresh data at the foot of the page, once the status of the EMPTY page has been changed to VALID.

It will be understood that the present invention has been described above purely by way of example, and modifications of detail can be made within the scope of the invention. Each feature disclosed in the description, and (where appropriate) the claims and drawings may be provided independently or in any appropriate combination.

What is claimed is:

1. A method of restricting access to data broadcast in a digital broadcast system, said method comprising:

assigning a plurality of sets of access rights to the data, each set of access rights being assigned to at least one party;

storing the sets of access rights and identifiers for the parties within the data;

transmitting the data to at least one receiver/decoder; and at the receiver/decoder having a memory, downloading and storing the transmitted data in the memory of the receiver/decoder;

comparing the identifier of a party requesting access to the data with the identifiers stored in the memory; and providing the party with the set of access rights assigned thereto in the memory of the receiver/decoder.

2. The method according to claim 1, wherein the data is transmitted in a digital datastream.

3. The method according to claim 1, in which a further set of access rights is assigned to at least one party whose identifier is not stored in the memory of the receiver/decoder, such a party requesting access to the data being provided with the further set of access rights.

4. The method according to claim 1, wherein a particular set of access rights is assigned to one party only, preferably the author of the data.

5. The method according to claim 1, wherein a particular set of access rights is assigned to a group of parties, identifiers for each of the members of the group being stored in the memory of the receiver/decoder.

6. The method according to claim 1, wherein a set of access rights is used to determine whether a party is prohibited from reading the data.

7. The method according to claim 1, wherein a set of access rights is used to determine whether a party is prohibited from overwriting the data.

8. The method according to claim 1, wherein the data is stored as files and directories in the memory of the receiver/decoder.

9. The method according to claim 1, wherein the data is stored in a Flash memory volume of the receiver/decoder.

10. An apparatus for restricting access to data stored in a memory of a receiver/decoder, the data having a plurality of sets of access rights being assigned thereto, each set of access rights being assigned to at least one party, and an identifier for each party being stored in the receiver/decoder, the apparatus comprising:

means for comparing the identifier of a party requesting access to the data with the identifiers stored in the memory; and means for providing the party with the set of access rights assigned thereto in the memory of the receiver/decoder.

11. The receiver/decoder comprising a memory for storing data, a plurality of sets of access rights assigned to the data and an identifier for each party, and apparatus for restricting access to the data as claimed in claim 10.

12. A transmission system, comprising:

means for assigning a plurality of sets of access rights to the data, each of the access rights being assigned to at least one party;

means for storing the access rights and identifiers for the parties within the data; and means for transmitting a bitstream including said data.

* * * * *